United States Patent [19]

Yokono et al.

[11] 3,963,796
[45] June 15, 1976

[54] EPOXY RESIN COMPOSITION HAVING EXCELLENT LATENT HARDENING CHARACTERISTICS

[75] Inventors: Hitoshi Yokono, Katsuta; Akio Nishikawa, Hitachi; Ritsuro Tada, Mitoshi; Yasuo Miyadera, Hitachi, all of Japan

[73] Assignees: Hitachi, Ltd.; Hitachi Chemical Company, Ltd., Japan

[22] Filed: Jan. 6, 1971

[21] Appl. No.: 104,398

[30] Foreign Application Priority Data
Jan. 6, 1970  Japan.................................. 45-2386

[52] U.S. Cl.................. 260/830 TW; 428/220; 260/2 EA; 260/2 N; 260/9; 260/18 PF; 260/37 EP; 260/47 EA; 260/47 EN; 260/59 EP; 260/836; 526/12; 526/49
[51] Int. Cl.............................................. C08g 45/06
[58] Field of Search.................. 260/47 EC, 47 N, 2, 260/18, 59, 830 TW, 94.6

[56] References Cited
UNITED STATES PATENTS

| | | | |
|---|---|---|---|
| 2,988,535 | 6/1961 | Feuchtbaum | 260/47 |
| 3,419,525 | 12/1968 | Aelony | 260/47 |

OTHER PUBLICATIONS

Handbook of Organic Chemistry – Beilsteins 1931 (pp. 570;571) vol. 14.

*Primary Examiner*—William H. Short
*Assistant Examiner*—T. Pertilla
*Attorney, Agent, or Firm*—Craig & Antonelli

[57] ABSTRACT

An epoxy resin composition having a remarkably improved storage stability and an excellent hardening characteristic when heated, which comprises an epoxy resin and an aromatic amino carboxylic acid or a derivative thereof as a hardener for the epoxy resin. This composition can be molded by injection molding, heretofore being deemed inapplicable to epoxy resin compositions, whereby the molded articled of epoxy resin can be produced with a high molding efficiency.

8 Claims, 1 Drawing Figure

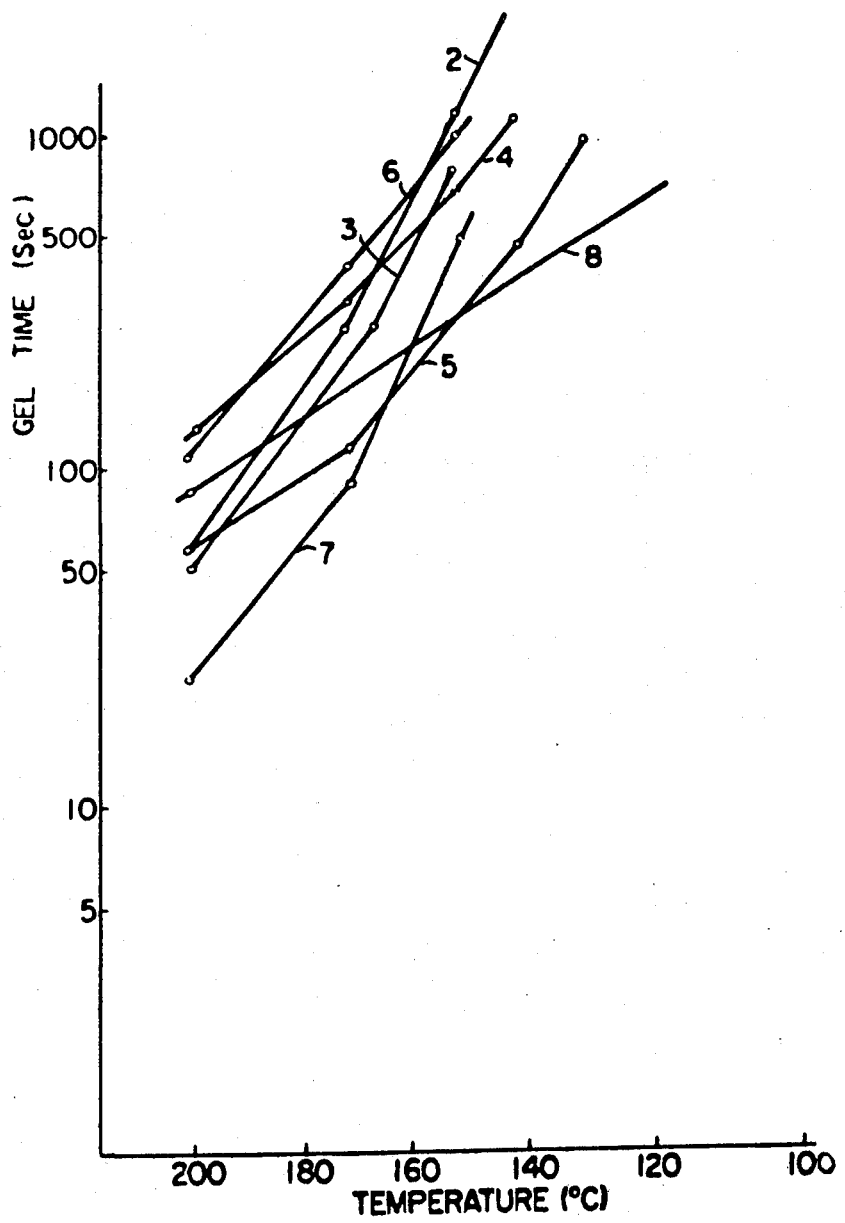

EPOXY RESIN COMPOSITION HAVING EXCELLENT LATENT HARDENING CHARACTERISTICS

BACKGROUND OF THE INVENTION

This invention relates to a thermosetting resin composition having excellent latent hardening characteristics, which comprises an epoxy resin and a novel hardener. More particularly, it relates to an epoxy resin composition having a remarkably elongated pot-life at storage temperatures as well as having a rapid hardening characteristic when heated.

Various kinds of epoxy resins have been employed in many fields, such as electrical insulation, moldings, castings, adhesives, coatings, etc., since the resulting cured articles are excellent in electrical, mechanical and chemical properties.

In one of the typical epoxy resin compositions which contains an acid anhydride as a hardener or curing agent, it is necessary to cure the composition at a considerably high temperature for a long time because the hardening characteristics of the composition are not good at the hardening temperature, while the composition is relatively stable at the storage temperature thereof. In order to improve the hardening characteristics of a composition of this type, there have been provided epoxy resin compositions containing suitable accelerators, such as, for example, tertiary amines, quaternary ammonium salts or complex salts of organometallic compounds. It is, however, an important disadvantage that these compositions have a very poor storage stability even though the hardening characteristics may be improved by adding such accelerators thereto. As an epoxy resin composition of latent hardening characteristics, there have been provided in the art epoxy resin compositions containing complexes of boron compounds as an accelerator. Not only are the latent hardening characteristics of these compositions insufficient, but also the properties of the cured articles tend to be undesirably influenced because these accelerators have a considerably water-absorption property.

Almost all of the thermosetting resins known in the art are capable of being molded by injection molding, and thermosetting resin compositions suitable for injection molding have been well developed. Injection molding is an advantageous technique because it is possible to remarkably save molding time and to increase production efficiency therewith. Only in the case of epoxy resin compositions, however, has injection molding not succeeded because there have not been provided epoxy resin compositions applicable and suitable for injection molding.

As is well known in the art, the resin composition to be injection molded is supplied to a heating cylinder provided with the screw of an injection molding machine, and the composition is subjected to heat in the cylinder, thereby softening the composition. This is followed by injection of the composition through a nozzle of the cylinder. In the case of conventional epoxy resin compositions, it has been difficult to avoid gelation of the composition in the heated cylinder because the hardening reaction of the softened composition begins to take place. Although it may be possible to prepare stable molding compositions in the cylinder of an injection molding machine by the addition of a suitable accelerator, it is then not possible to perform the injection molding with high efficiency because in such a case the hardening characteristics of the composition are insufficient, and it takes a long molding time to sufficiently harden the composition injected into the mold.

Therefore, in the injection molding of epoxy resin compositions, the compositions must have a superior latent hardening characteristic as compared with compositions conventionally used for transfer molding, compression molding or the like. In other words, the high thermal stability of the composition softened in the heating cylinder must be accompanied by a rapid hardening characteristic in the mold.

SUMMARY OF THE INVENTION

Accordingly, one of the objects of the present invention is to provide an epoxy resin composition having excellent latent hardening characteristics.

Another object of this invention is to provide an epoxy resin composition having an extremely short hardening time when heated, while maintaining an excellent storage stability.

It is another object of the present invention to provide a novel epoxy resin composition containing a latent hardener or latent curing agent which can be employed readily and advantageously in an injection molding procedure with a high production efficiency.

These and other objects and advantages of the present invention will become apparent to those skilled in the art from a consideration of the following specification and claims, taken in conjunction with the accompanying drawing.

In accordance with the present invention, an epoxy resin composition having an excellent latent hardening characteristic is provided by utilizing an amino carboxylic acid compound as a hardener for a suitable epoxy resin having at least one epoxy group in the molecule.

DETAILED DESCRIPTION OF THE INVENTION

The epoxy resins suitable for use in the present invention are exemplified as follows:

1. polyglycidyl ethers or polyglycidyl esters synthesized by the polycondensation of a polyhydroxyl alcohol, such as, bis-phenol A, halogenated bis-phenol A, catechol, resorcinol or glycerine, and epichlorohydrin in the presence of a basic catalyst.
2. epoxy novolac resins synthesized by the polycondensation of phenol novolac resins and epichlorohydrin.
3. epoxidized polyolefins, such as, epoxidized polybutadiene and dicyclopentadienyl oxide.
4. epoxidized vegetable oils.
5. cyclohexide derivatives, such as, vinyl cyclohexene dioxide, dipentane dioxide, 2,2-bis(3,4-epoxycyclohexyl)propane, bis(2,3-epoxycyclopentyl)ether and dicyclopentadiene dioxide.

Various amino carboxylic acid compounds may be employed as a hardener for the epoxy resin compositions in accordance with the present invention. Exemplary thereof are aromatic amino carboxylic acids and derivatives thereof, such as the esters and acid amides thereof, and aliphatic amino carboxylic acids.

It has been found in accordance with this invention that the aromatic amino carboxylic acids, such as benzidine carboxylic acid, diamino diphenyl methane carboxylic acid and diamino benzoic acid, or an additive product of an amino carboxylic acid and an epoxy resin, are preferred as the hardener because these aromatic compounds provide a superior latent hardening characteristic.

Although the present inventors do not intend to be bound by the veracity of any theoretical explanation, it is supposed that the amino carboxylic acid compound forms an inner salt through the -NH₂ and -COOH included in the compound at low temperatures, so that the reaction between the epoxy compound and the amino carboxylic acid does not take place. When the composition is heated, the inner salt disappears because the molecule is activated, and the reaction strongly takes place.

It is preferred, in accordance with this invention, to employ amino carboxylic acid compounds having an electron drawing group for suppressing the reactivity of active hydrogen atoms in the -NH₂ moiety at relatively low temperatures. From this point of view, it may be said that amino carboxylic acid compounds having a -COOH group are more suitable than esters or acid amides of amino carboxylic acids. Furthermore, in the case of aromatic amino carboxylic acid compounds, compounds wherein the -NH₂ and -COOH groups attach to adjacent positions on the aromatic ring are preferable because they tend to form an inner salt in the molecule more easily.

Examples of amino carboxylic acid compounds to be employed in the present invention are shown in the following:

1) 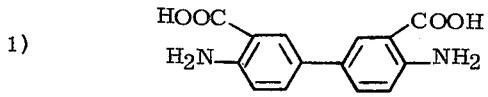

benzidine-3,3'-dicarboxylic acid (BZC)

2) 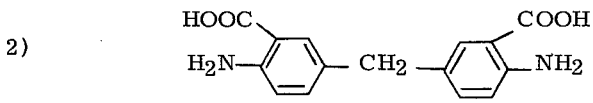

4,4'-diaminodiphenylmethane-3,3'-dicarboxylic acid (DAMC)

3) 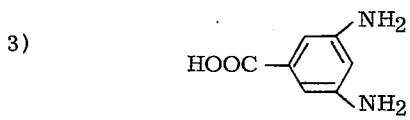

3,5-diaminobenzoic acid (DABA-3,5)
4) 3,4-diaminobenzoic acid (DABA-3,4)
5) L-arginine
6) cystine
7) 5-hydroxy-L-lysine
8) L-lysine
9) 2,3-diaminosuccinic acid
10) L-α,γ-diaminobutyric acid
11) α,β-diaminopropionic acid Epoxy resin compositions containing only the amino carboxylic acid compound as a hardener are somewhat insufficient with respect to their hardening characteristics when adapted for injection molding. This is believed to result from the fact that since an unreacted substance remains in the article molded by injection molding under a predetermined hardening condition, such as 200°C. for 90 seconds, the article has a somewhat deficient hardness and mold-releasing property. This may result because the amino carboxylic acid compound does not dissolve well in the epoxy resin at 200°C. or temperatures of this order.

In accordance with a further embodiment of the invention, it has been found that these problems can be solved by employing an agent for lowering the melting point of the amino acid compound. For example, the melting points of BZC, DAMC, DABA-3,5 and DABA-3,4 are, respectively, 300°C., 232°C., 228°C. and 210°C. Therefore, epoxy resin compositions including these hardeners may not show a good hardening property when injection molded at 200°C. However, the hardening characteristics of these compositions can be remarkably improved by employing as the hardener a composition comprising the amino carboxylic acid and the melting point lowering agent, having a melting point lower than the hardening temperature, the latter being, for example, about 200°C.

Examples of melting point-lowering agents include the following:
1) 4,4'-diamino-3,3'-dichlorodiphenylmethane [MOCA (trade name); m.p. 105°–109°C.]
2) 4,4'-diaminodiphenylmethane (DAM; m.p. 88°–92°C.)
3) o-toluidine (m.p. 129°–130°C.)
4) 4,4'-diamino-3,3',5,5'-tetraethyldiphenylmethane (tetraethyl DAM; m.p. 85°–90°C.)
5) 4,4'-diamino-3,3'-diethyldiphenylmethane (diethyl DAM; m.p. 43°–47°C.)
6) diaminodiphenyl sulfone (DDS; m.p. 168°–171°C.)

7) 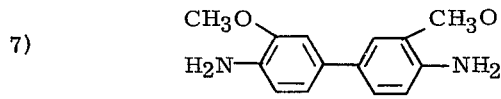

o-dianisidine (m.p. 127°–130°C.)
8) 3,3'-diaminodiphenyl sulfone (m.p. 170°C.)

Almost all of the above compounds and the additive products of the amino carboxylic acids and epoxy resins are conventionally used as hardeners for epoxy resin compositions. However, in the present invention, they are used for lowering the melting point of the amino carboxylic acid compound or used as a hardening accelerator, to thereby improve the hardening characteristics at the molding temperature. Although there is not always the necessity to use the mixture of the amino carboxylic acid compound and the melting point-lowering agent, such as in molding methods wherein after-curing can be employed, the use of this mixture is rather important with, for example, injection molding, where an after-curing treatment cannot be employed.

In one example wherein a mixture of DAMC and DAM was employed as a hardener, the melting points of mixtures containing various amounts of DAM were measured. The results showed that the larger the content of DAM in the mixture, the lower the melting point. For example, when the content of DAM to DAMC + DAM is 10% by weight, the melting point is about 222°C. Similarly, when the content is 15%, the melting point is about 218°C. By employing the epoxy resin composition containing such a mixture, the hardening characteristics can be properly improved and modified.

In consideration of the storage stability or storage life and hardening characteristics of the composition, the melting point-lowering agent is preferably chosen from the amine compounds, especially aromatic amine compounds as described hereinabove. In addition, where an aromatic amine compound which reacts with the epoxy resin is used, excellent cured articles are obtained.

The additive amount of hardener to epoxy resin is determined by the equivalent ratio of amino groups with respect to the epoxy resin. In general, one equivalent of epoxy resin is mixed with 1–1½ equivalents of amino carboxylic compound. When a hardening accelerator is used together with the amino carboxylic compound, the accelerator may be employed in the form of a capsule.

As is well known in the art, compositions containing an epoxy resin and a hardener can be mixed with other materials, if desired, such as fillers, release agents, pigments, softeners, modifiers, inhibitors, diluents, etc. All of these materials are well known in the art, and an addition of this nature can be made in connection with the epoxy resin compositions of the present invention, as desired or required.

In the following description, the testing conditions as to the epoxy resin compositions and the cured articles produced therefrom were determined as follows:

1. With regard to the dielectric loss tan $\delta$, dielectric constant $\epsilon$, heat distortion temperature HDT (°C.), water absorbing ratio (%) and impact strength (kg.cm/cm$^2$), tests were conducted under JIS-K-6911 (Japanese Industrial Standard-K-6911).

2. Spiral flow values were determined by the method of SPI-EMMI-1~66, which is the standard of the American Plastics Industry.

3. Thermal stability, represented as the gel time at 100°C., is the time elapsed until the composition will no longer flow out from a small hole provided in the bottom of a mold, in which the composition has been formed into a tablet and kept at 100°C. for a predetermined amount of time, followed by pressing the composition by means of a piston in the mold.

BRIEF DESCRIPTION OF THE DRAWING

The accompanying drawing shows the hardening properties of various epoxy resin compositions.

EXAMPLES OF THE INVENTION

The following examples are given merely as illustrative of the present invention and are not to be considered as limiting. Unles otherwise noted, the parts indicated therein are by weight.

EXAMPLE 1

A powdered epoxy resin composition, the ingredients of which are shown below, was prepared by mixing the ingredients and kneading the mixture by means of a pair of six inch rollers heated at 80°C. for 10 minutes, followed by grinding the resulting mixture in order to prepare a moldable epoxy resin composition powder. The ingredients of the composition are as follows:

| | |
|---|---|
| Epicote 1001 (bis-phenol A type epoxy resin having an epoxy equivalent of 450–500; trade name of Shell Chemical Co.) | 60 parts |
| BZC | 8.7 |
| calcium stearate (release agent) | 1.0 |
| silica powder (filler) | 18 |
| carbon black | 2.0 |

-continued

| | |
|---|---|
| (coloring agent) | |

The storage life of the resulting composition at room temperature is 6 months or more, and this composition is sufficiently thermally stable to be employed in an injection molding machine of an in-line type.

The composition was molded by means of a 28 ton transfer molding machine (manufactured by Hull Company) under a molding pressure of 1,000 p.s.i., a molding temperature of 180°–200°C. and a molding time of 90–180 seconds. The resultant molded articles have the following mean properties:

| | |
|---|---|
| tan $\delta$ | $2.0 \times 10^{-2}$ |
| $\epsilon$ | 4.10 (at 1 MH$_z$) |
| bending strength | 10 kg./mm.$^2$ |
| HDT | 111°C. |

The thermal stability, i.e., gel time at 100°C. of a tablet made of the above epoxy resin composition is about 15 minutes or more, while that of a conventional epoxy molding composition is nearly zero. From these results, it will be appreciated that the epoxy resin compositions according to this invention have an excellent thermal stability at relatively low temperatures. The hardening time at 170°C. of the above composition is about 90 seconds, this factor indicating a good hardening characteristic.

EXAMPLE 2

An epoxy resin composition having the following ingredients was prepared in the same manner as described in Example 1, except that the mixture was kneaded by means of a pair of rolls heated at 70°C. for 20 minutes:

| | |
|---|---|
| Araldite 6071 (bis-phenol A type epoxy resin having an epoxy equivalent of 425–550; manufactured by Ciba Co.) | 60 parts |
| BZC | 6.8 |
| calcium stearate | 1.5 |
| silica powder | 20 |
| pulp | 5 |
| clay | 100 |
| carbon black | 2 |

The storage life of the resulting composition was several months or more, and the thermal stability thereof at low temperatures satisfies the requirements for injection molding. This composition displayed a satisfactory thermal stability at 100°C. of 15 minutes or more and has a hardening time at 170°C. of 90 seconds.

Cured articles made therefrom have the following properties:

| | |
|---|---|
| tan $\delta$ | $1.9 \times 10^{-2}$ |
| $\epsilon$ | 4.20 (at 1 MH$_z$) |
| flexural strength | 9.5 kg./mm.$^2$ |
| HDT | 110°C. |

EXAMPLE 3

An epoxy resin composition having the following ingredients was prepared by the same method as described in Example 1, except that the kneading was carried out for 25 minutes:

| | |
|---|---|
| Epicote 1001 | 60 parts |

-continued

| | |
|---|---|
| DAMC | 4.6 |
| DABA-3,5 | 2.0 |
| zinc stearate | 2.0 |
| pulp | 10 |
| clay | 108 |
| carbon black | 2 |

The resulting composition has a storage life at room temperature of several months or more and has a sufficient thermal stability at above room temperature such that it is suitable for injection molding.

Cured articles of the above composition have the following mean properties:

| | |
|---|---|
| tan δ | $2.10 \times 10^{-2}$ |
| ε | 4.10 (at 1 MH$_z$) |
| flexural strength | 9.8 kg./mm. |
| HDT | 108°C. |

EXAMPLE 4

An epoxy resin composition comprising the following ingredients was prepared in the same manner as described in Example 1, except that the kneading was carried out for 20 minutes:

| | |
|---|---|
| Epicote 1001 | 60 parts |
| DAMC | 4.6 |
| BZC | 4.3 |
| zinc stearate | 1.3 |
| polyethylene powder | 2 |
| pulp | 18 |
| silica powder | 18 |
| clay | 120 |
| carbon black | 2.0 |

The above composition has a storage life at room temperature of several months or more and has a gel time at 100°C. of greater than 20 minutes and a hardening time at 170°C. of 90 seconds.

Molded articles made from this composition have the following mean properties:

| | |
|---|---|
| tan δ | $2.0 \times 10^{-2}$ |
| ε | 4.2 (at 1 MH$_z$) |
| flexural strength | 9.9 kg./mm.$^2$ |
| HDT | 110°C. |

EXAMPLE 5

An epoxy resin composition comprising the following ingredients was prepared by the same manner as described in Example 1, except that the kneading was carried out for 25 minutes:

| | |
|---|---|
| Epicote 1001 | 60 parts |
| DAMC | 4.6 |
| DABA-3,5 | 2.0 |
| calcium stearate | 2.2 |
| pulp | 10 |
| clay | 108 |
| carbon black | 2.0 |

The storage life at room temperature of the above composition was greater than six months and the thermal stability at above room temperature satisfies the requirements for injection molding of the in-line type.

Cured articles made from this composition by means of a 28 ton transfer molding machine (manufactured by Hull Company) under a molding pressure of 1,000 p.s.i., a molding temperature of 180°–200°C. and a molding time of 90–180 seconds have the following mean properties:

| | |
|---|---|
| tan δ | $2.1 \times 10^{-2}$ |
| ε | 4.20 (at 1 MH$_z$) |

EXAMPLE 6

An epoxy resin composition comprising 40 parts of Epicote 1001, 20 parts of ECN-1299, 1.5 parts of stearic acid, 18 parts of pulp, 18 parts of silica powder, 90 parts of clay and 73 parts of carbon black was prepared by kneading the composition by means of a pair of six inch rolls heated at 80°C. for 15 minutes, and then powdering the resulting mixture. The obtained powdery composition was admixed, by means of the above rolls, with 11.5 parts of BZC and 3 parts of carbon black through kneading for 5 minutes, and then the resulting mixture was powdered.

The gel time at 100°C. of the resulting composition was greater than 20 minutes and the hardening time at 170°C. was about 90 seconds.

The mean properties of molded articles made from this composition were found to be as follows:

| | |
|---|---|
| tan δ | $2.2 \times 10^{-2}$ |
| ε | 4.0 (at 1 MH$_z$) |
| flexural strength | 11 kg./mm.$^2$ |
| HDT | 143°C. |

EXAMPLE 7

An epoxy resin composition comprising the following ingredients was prepared in the same manner as described in Example 1, except that the rolls were heated at 60°C.:

| | |
|---|---|
| Epicote 1001 | 60 parts |
| ECN 1299 | 10 |
| DAMC | 12.4 |
| calcium stearate | 2.5 |
| pulp | 10 |
| silica powder | 20 |
| clay | 100 |
| carbon black | 2.5 |

This composition also displayed excellent latent hardening characteristics. Molded articles made therefrom have the following mean properties:

| | |
|---|---|
| tan δ | $2.2 \times 10^{-2}$ |
| ε | 4.2 (at 1 MH$_z$) |
| flexural strength | 11 kg./mm.$^2$ |
| HDT | 125°C. |

EXAMPLE 8

An epoxy resin composition comprising 35 parts of Epicote 1001, 25 parts of ECN 1273 (manufactured by Ciba Products Company, a novolac type epoxy resin having an epoxy equivalent of 225), 5 parts of pulp, 20 parts of silica powder and 100 parts of clay was prepared in accordance with the method described in Example 1, except that the kneading was carried out for 15 minutes, and the resulting mixture was powdered. The resultant powdered composition was kneaded, by means of a pair of 6 inch rolls heated at 70°C., for 5 minutes with 2 parts of carbon black and 13.4 parts of DAMC. Then, the mixture was powdered.

The composition thus prepared has a gel time at 100°C. of greater than 15 minutes and has a hardening time at 170°C. of 70 seconds. It can thus be seen that this composition also has excellent latent hardening characteristics. Molded articles made from this composition have the following mean properties:

| | |
|---|---|
| tan δ | $2.2 \times 10^{-2}$ |
| ε | 4.10 (at 1 MH$_z$) |
| flexural strength | 10 kg./mm.$^2$ |
| HDT | 150°C. |

EXAMPLE 9

An epoxy resin composition comprising the following ingredients was prepared in the same manner as described in Example 1, except that the rolls were heated at 60°C.:

| | |
|---|---|
| ECN 1273 | 60 parts |
| DAMC | 19 |
| calcium stearate | 2.2 |
| silica powder | 18 |
| pulp | 18 |
| clay | 90 |
| carbon black | 2.0 |

The gel time at 100°C. of the resulting composition was greater than 15 minutes. Molded articles made from this composition have the following mean properties:

| | |
|---|---|
| tan δ | $2.10 \times 10^{-2}$ |
| ε | 4.0 (at 1 MH$_z$) |
| flexural strength | 12 kg./mm.$^2$ |
| HDT | 191°C. |

EXAMPLE 10

An epoxy resin composition which comprises 60 parts of Epicote 1001, 4.7 parts of 2,5-diaminobenzoic acid, 2.5 parts of zinc stearate, 2.0 parts of pulp, 18 parts of silica powder, 90 parts of clay and 40 parts of carbon black was prepared in the same manner as described in Example 1, except that the rolls were heated at 60°C. and the kneading was carried out for 20 minutes.

The gel time at 100°C. of the resulting composition was greater than 15 minutes and the hardening time at 170°C. was less than 90 seconds.

EXAMPLE 11

In this example, a mixture of DAMC and DAM was used at the same time as a composite hardener.

An epoxy resin composition which comprises 60 parts of Epicote 1001, 1.0 part of DAM, 7.6 parts of DAMC, 2,2 parts of zinc stearate, 2.0 parts of pulp, 18 parts of silica powder, 90 parts of clay and 40 parts of carbon black was prepared by the same method as described in Example 1, except that the rolls were heated at 60°C. and the kneading was carried out for 25 minutes.

The resulting composition has a gel time at 100°C. of greater than 15 minutes and has a hardening time at 170°C. of less than 90 seconds.

EXAMPLE 12

In this example, a eutectic mixture consisting essentially of 2.0 parts of DAM and 6.1 parts of DAMC was used as a hardener. The eutectic mixture was prepared by dissolving the desired amounts of these compounds in a 20% HCl solution and neutralizing the eutectic mixture by means of a 20% NaOH solution in order to precipitate it from the solution.

An epoxy resin composition comprising 60 parts of Epicote 1001, 8.1 parts of said eutectic mixture, 2.5 parts of zinc stearate, 2.0 parts of pulp, 18 parts of silica powder, 90 parts of clay and 4.0 parts of carbon black was prepared in the same manner as described in Example 1, except that the rolls were heated at 60°C. and the kneading was carried out for 16 minutes.

The gel time at 100°C. was greater than 15 minutes and the hardening time at 170°C. was less than 90 seconds.

In the case where a mixture consisting essentially of the amine carboxylic acid and the amino compound having a melting point lower than that of DAMC is used as a hardener, the advantages of a shorter kneading time and more excellent hardening characteristics at 100°C. (and temperatures around this value) are obtained. It is supposed that these better results are mainly due to the reasonably low melting point of the mixture, whereby the hardener shows a good reactivity with the epoxy resin at the hardening temperature, while at the relatively low temperature of, for example, 100°C., the hardener does not promote the hardening of the epoxy resin.

EXAMPLE 13

In this example, an epoxy resin composition comprising the following ingredients was used as a material for a low-pressure transfer molding:

| | |
|---|---|
| ECN 1273 | 70 parts |
| DAMC | 22 |
| stearic acid | 2.0 |
| powdered quartz glass (100 mesh) | 220 |

This composition was kneaded by means of a pair of six inch rolls heated at 60°C. for 5 minutes, followed by grinding. The resultant composition is stable at room temperature for 6 months or more and has a spiral flow property of 36.5 inches at 180°C. The linear thermal expansion coefficient thereof is $2.2 \times 10^{-5}$/°C.

EXAMPLE 14

The composition obtained in this example was also used as a material for a low-pressure transfer molding. The ingredients of the composition are as follows:

| | |
|---|---|
| ECN 1273 | 25 parts |
| Epicote 1001 | 25 |
| DAMC | 12 |
| stearic acid | 2.0 |
| powdered quartz glass | 187 |

The resulting composition is stable at room temperature for 6 months or more and has a spiral flow property at 180°C. of 26 inches. The linear thermal expansion coefficient thereof is $1.6 \times 10^{-5}$/°C.

EXAMPLE 15

In this example, the epoxy resin composition was used as a material for fluidized bed coating.

An epoxy resin composition comprising 100 parts of Epicote 1008, 7.3 parts of DAMC and 5 parts of zinc salicylic acid (an accelerator) was kneaded, by means of a pair of 6 inch rolls heated at 80°C., for 30 minutes, and then the mixture was ground to a powder of 100 to 325 mesh. The resulting powdered epoxy resin composition was coated by means of a fluidized bed coating procedure on a ceramic substrate, and the substrate was subjected to a heat cycle test (−50°C. for 30 minutes to +120°C. for 30 minutes). In this test, no cracks occurred in the coating and no drop of the type which takes place when the coating material has a flow property that is too large was observed.

The above composition has a storage life at room temperature of greater than several months, as compared with conventional epoxy resin compositions normally used for fluidized bed coatings, which have a storage life of only 20 days or less.

EXAMPLE 16

The epoxy resin composition in this example was also used as a material for fluidized bed coating. The composition was obtained from a mixture comprising 100 parts of Epicote 1001 and 3.5 parts of DAMC in the same manner as described in Example 1, except that the roll temperature was 110°C. and the kneading time was 30 minutes.

The resulting powdered composition of 100 to 325 mesh was coated by means of a fluidized bed coating procedure onto a ceramic substrate, and then the substrate was subjected to a heat cycle test (−50°C. for 30 minutes to +120°C. for 30 minutes). No cracks appeared in the coating. The composition also has a good storage stability at room temperature.

The reason why the epoxy resin compositions according to the present invention have excellent latent hardening characteristics can be seen from the fact that the compositions have a hardening property as illustrated in the Figure in the accompanying drawing, in which the ordinate represents the gel time (in seconds) and the abscissa represents the reciprocal of the absolute temperature (°K). However, in the Figure, the abscissa is shown in (°C.) for simplification. Curves 2–8 in the Figure show, respectively, the hardening properties of epoxy resin compositions comprising the following ingredients:

Curve 2: Epicote 1001 and BZC (mixing ratio by weight of 100:14.4)
Curve 3: Epicote 1001 and DAMC (100: 15.2)
Curve 4: Epicote 1001 and DABA-3,4 (100:8)
Curve 5: Epicote 1001 and DABA-3,5 (100:8)
Curve 6: ECN 1273 and DAMC (100:31.8)
Curve 7: ECN 1273 and BZC (100:30.2)
Curve 8: Epicote 1001 and DAM (100:10)

Curve 8, which shows the hardening property of a conventional epoxy resin composition comprising a bis-phenol type epoxy resin and DAM, can be seen to compare with the hardening property of the epoxy resin compositions according to the present inventon. By comparison between the respective curves, it can be seen that the epoxy resin compositions of the present invention have a hardening property such that at relatively low temperatures the gel time is considerably large, i.e., the composition is stable at that temperature and, on the contrary, at hardening temperatures the gel time is small. Since the latent hardening characteristics may be determined by the degree of inclination of the gel time-temperature curve, as shown in the Figure, the inventive composition, wherein the gel time-temperature curve has a remarkably large inclination, is excellent in the latent hardening characteristics.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:
1. An epoxy resin composition comprising an epoxy resin selected from the group consisting of polyglycidyl ethers of bis-phenol A and epichlorohydrin, polyglycidyl ethers of a novolac resin and combinations thereof and diaminodiphenylmethane dicarboxylic acid in an amount of substantially equivalent ratio with respect to said epoxy resin.

2. An epoxy resin composition comprising an epoxy resin selected from the group consisting of polyglycidyl ethers of bis-phenol A and epichlorohydrin, polyglycidyl ethers of a novolac resin and combinations thereof, diaminodiphenylmethane dicarboxylic acid and an aromatic amino compound having a melting point lower than 200°C but higher than 43°C, said diaminodiphenylmethane dicarboxylic acid and aromatic amino compound being added in the powder form to said epoxy resin in such an amount that amino groups in said compounds are substantially equivalent ratio with respect to said epoxy resin.

3. An epoxy resin composition for use in injection molding which is a powdery composition comprising an epoxy resin selected from the group consisting of polyglycidyl ethers of bis-phenol A and epichlorohydrin, polyglycidyl ethers of a novolac resin and combinations thereof, diaminodiphenylmethane dicarboxylic acid and an aromatic amino compound having a melting point lower than 200°C but higher than 43°C, said diaminodiphenylmethane dicarboxylic acid and aromatic amino compound being admixed homogeneously with said epoxy resin in such an amount that amino groups in said compounds are substantially equivalent ratio with respect to said epoxy resin.

4. The epoxy resin composition according to claim 2, wherein said aromatic amino compound is diaminodiphenylmethane.

5. The epoxy resin composition according to claim 3, wherein said aromatic amino compound is diaminodiphenylmethane.

6. A hardened epoxy resin obtained by heating an epoxy resin selected from the group consisting of polyglycidyl ethers of bis-phenol a and epichlorohydrin, polyglycidyl ethers of a novolac resin and combinations thereof and diaminodiphenylmethane dicarboxylic acid in an amount of substantially equivalent ratio with respect to said epoxy resin at a temperature, and for sufficient time to substantially harden said resin.

7. A hardened epoxy resin obtained by heating an epoxy resin selected from the group consisting of polyglycidyl ethers of bis-phenol A and epichlorohydrin, polyglycidyl ethers of a novolac resin and combinations thereof, diaminodiphenylmethane dicarboxylic acid and an aromatic amino compound having a melting point lower than 200°C but higher than 43°C, said diaminodiphenylmethane dicarboxylic acid and aromatic amino compound being added in the powder form to said epoxy resin in such an amount that amino groups in said compounds are substantially equivalent ratio with respect to said epoxy resin at a temperature, and for sufficient time to substantially harden said resin.

8. The epoxy resin according to claim 7, wherein said aromatic amino compound is diaminodiphenylmethane.

* * * * *